United States Patent Office 2,765,111
Patented Oct. 2, 1956

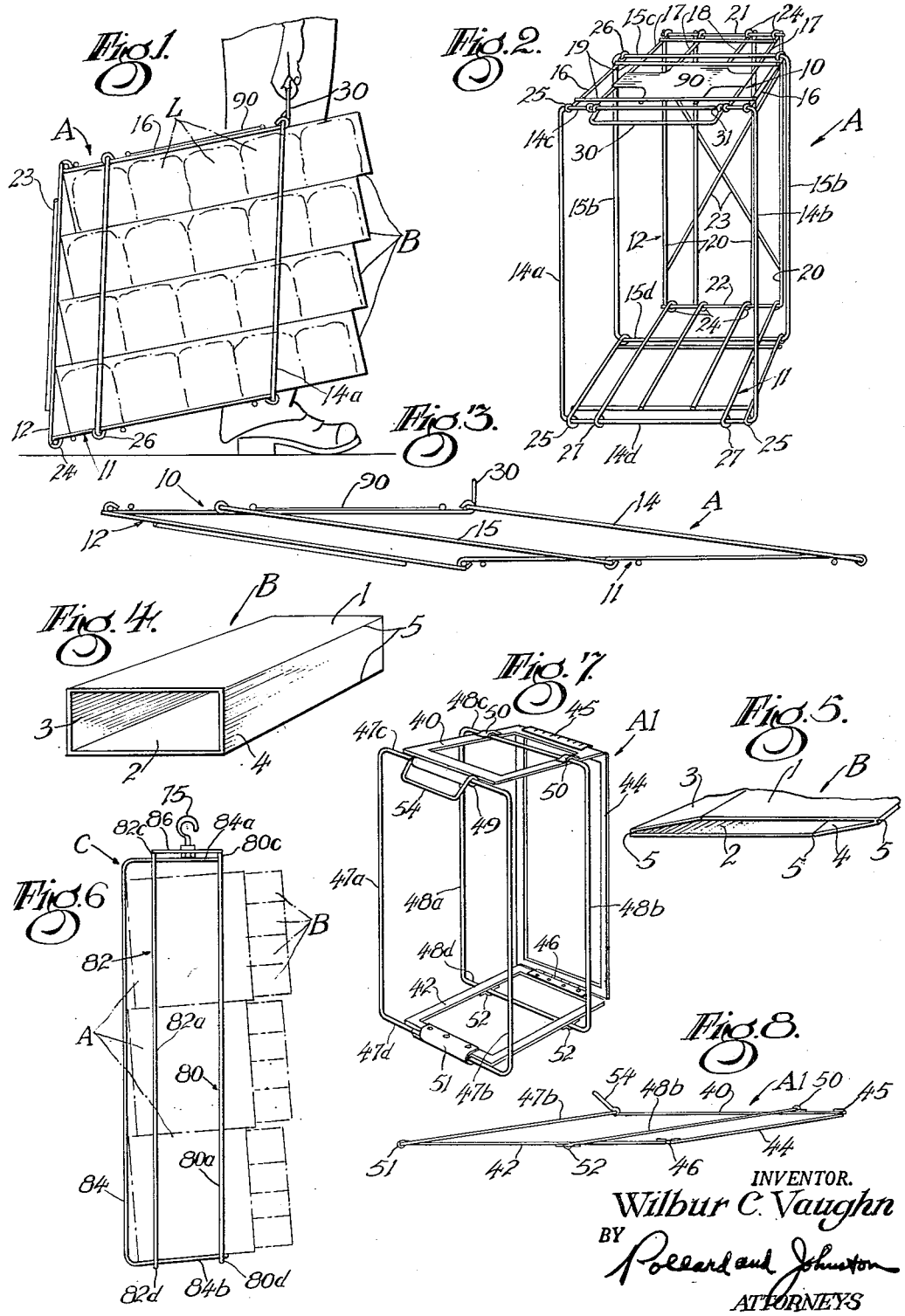

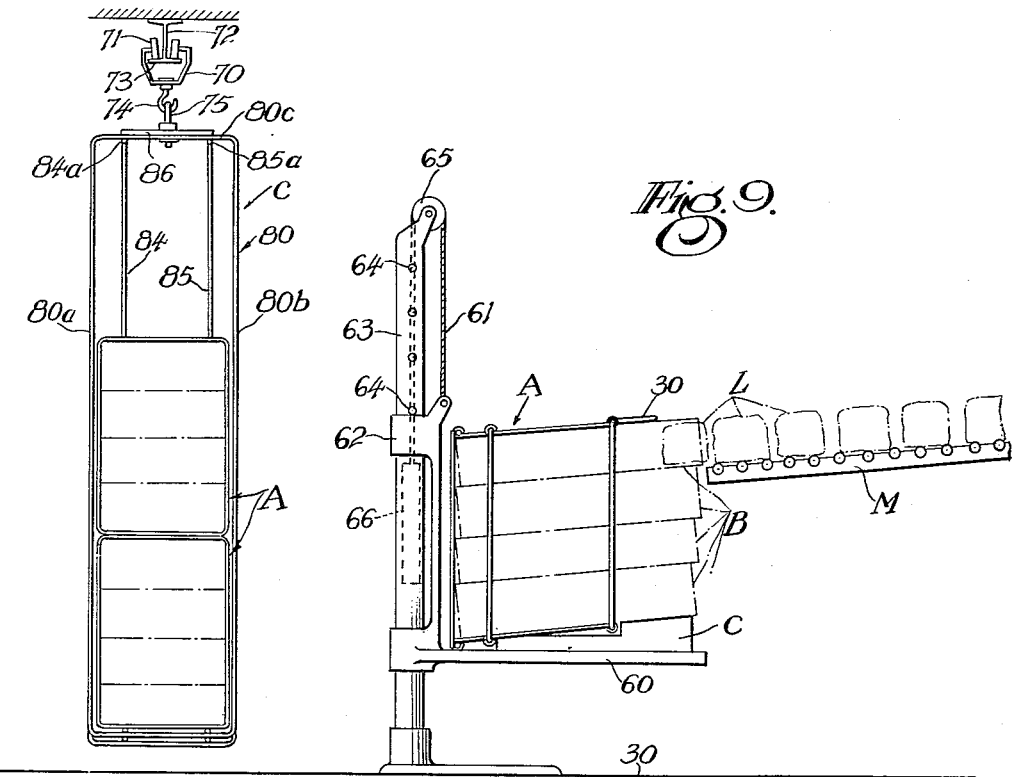
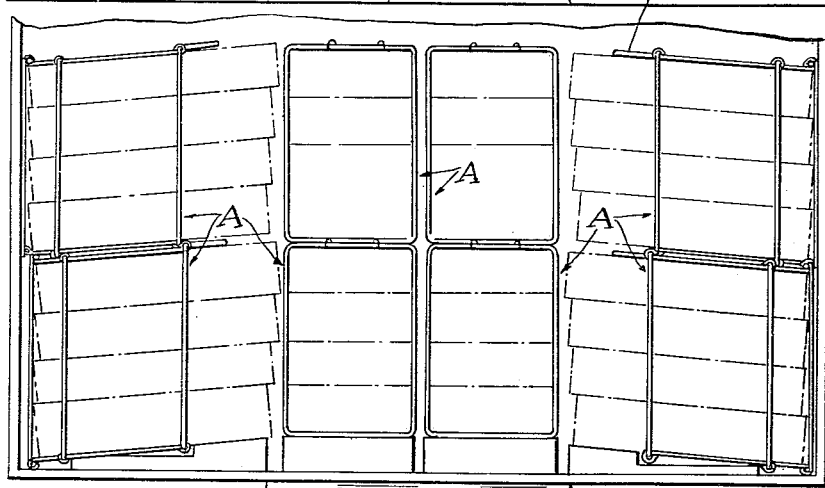
Fig. 9.
Fig. 10.
INVENTOR.
Wilbur C. Vaughn
BY
Pollard and Johnston
ATTORNEYS

2,765,111

SYSTEM AND APPARATUS FOR HANDLING STACKED ARTICLES, ESPECIALLY CONTAINERS FOR BAKERY PRODUCTS

Wilbur C. Vaughn, Berwick, Pa.

Application July 8, 1952, Serial No. 297,627

12 Claims. (Cl. 224—45)

This invention relates to a new system and new apparatus adapted especially for use in the handling and the distribution of bulky easily crushed products, for example, bakery products such as loaves of bread, pies, packaged rolls, or other "soft goods."

The baking industry has long experienced difficulty in the distribution of bread loaves and other soft products, in that these products are frequently crushed or otherwise damaged while being handled and transported between places where they are wrapped for delivery and the food markets, restaurants or other places where they are to be consumed or resold. Resulting complaints and returns of damaged products are sources of much trouble and expense, and expensive precautions are taken in the effort to limit this difficulty.

Rigid open boxes to hold layers of the products have been used for deliveries by many bakeries, but these boxes are cumbersome and costly, and frequent conversions of them to unauthorized uses enhance the cost of this practice. In order to avoid this problem, some bakeries have made use of collapsible tubular containers or receptacles which are loaded individually with single layers of bread loaves leaving wrapping machines. When loaded, these receptacles are carried on endless conveyors or in wheeled open boxes to truck loading stations from which they are transferred by hand to stacks in delivery trucks. In this practice, however, there is a problem of storing the filled tubes between wrapping and truck loading stations, and products are likely to be crushed by collapsing tubes when the loaded tubes are arranged in stacks, or when several loaded tubes are carried and set down together from a deliveryman's arms.

The principal object of my invention is to provide a system and apparatus for handling and transporting articles such as tubular receptacles for fresh bread loaves or other fragile products, by which the articles are stored and transported in easily portable stacks and so as to simplify their distribution and eliminate or greatly reduce the likelihood of damage to the products held in them in the course of their distribution to purchasers. Another object is to reduce the manual operations involved in collecting together and transporting such articles, and to eliminate all need for individual handling of the products or of receptacles used to hold them before they reach purchasers, thus increasing the efficiency and reducing the expense of distribution. Yet another object is to bring about a highly advantageous utilization of production plant space for the temporary storage of the fresh or undelivered products.

A further object of this invention is to provide new collapsing portable carriers for stacks of articles such as tubular receptacles for such fragile products, as well as new combinations of the carriers with tubular receptacles.

Still other objects of the invention are to provide such portable carriers and combinations of the same with stacked receptacles, which will serve purposes above mentioned and also serve for displaying the bread loaves or other fragile products, or for displaying and dispensing them in retail stores; and to provide carriers for such purposes which are highly durable though easily portable, and which can be collapsed when emptied so as to require little space during storage or while being returned to a bakery or other plant for reuse.

According to this invention, I have provided a system of handling and distributing bread loaves or other soft or fragile products, which makes use of collapsible tubular receptacles to receive and protect single layers of the products as they are slid into the receptacles, for example, from wrapping machines, and these receptacles are held securely and transported in stacks by means of collapsible portable carriers which receive the receptacles through open ends and confine them against lateral displacements so that the receptacles of a stack in each carrier support one another in open condition without any freedom to collapse; and the carriers furthermore are constructed so that each carrier holding a stack of receptacles can be easily lifted and carried with one hand without danger of spilling products in the receptacles and can be stacked with other similarly loaded carriers for very efficient storage and conveyance at production plants and/or on delivery trucks or the like.

In addition, for the storage and conveyance of stacks of the loaded carriers at such plants, a set of many movable ceiling-supported or floor-supported open baskets or cradles may be provided, each of which receives and securely holds a stack of several of the loaded carriers and can be pushed to and fro to move the carriers in desired paths between carrier loading stations and a delivery truck loading platform.

In the use of this system, for example, bread loaves or similar products loaded into the apparatus from wrapping machines can be transported and protected by the apparatus throughout the course of their distribution, so that the products never need to be handled individually and are assured of reaching purchasers in their original form and appearance. Moreover, an optimum utilization of storage space can be obtained with this system, both in bakeries and in delivery trucks; the required units of apparatus can be provided at relatively low cost; and these units are so particularly adapted for the needs of product distributors that they are not likely to be converted to unauthorized uses.

The collapsible carriers provided according to this invention have the form of upright hollow parallelepipedons each of which is open at its front side to receive a stack of the receptacles or other articles projecting therethrough and has all of its side members hinged together on parallel axes for simultaneous relative swinging movements between an open position in which it is vertically rigid and can rest on a bottom side of the structure and a collapsed position in which the several side members are nearly parallel. The back and said two opposite sides of the structure are defined by rigid substantially flat closure or panel members, the side panel members being hinged to opposite ends of the back member, while the other opposite sides of the structure are defined by rigid link or linear members which interconnect the two side panels and swing in substantially parallel relation to each other and to the back panel.

Each carrier thus constitutes a freely deformable structure that can assume or be deformed easily to any desired angular position between a fully open position in which its meeting sides lie substantially square to each other and a fully collapsed position in which they lie nearly parallel to each other.

Such a carrier structure provides an important combination of functions: It can be held in open position by a stack of fitting elongated articles, such as tubular bakery product receptacles, and these articles are easily inserted into it through its open front side; it can be carried comfortably in suspension by hand or on a hook, by means of structure near the front of its top side, whether it be loaded or empty, or open or collapsed; when so carried in loaded condition, the weight of the carrier and its contents assumes a balanced position, in which contents projecting through the open front slope upwardly so as to be held securely in the assembly; the carrier will hold its contents securely both when resting on its bottom side and when being carried in suspension from its top side; when loaded and in fully open position it will support safely the weight of any desired number of similar loaded carriers stacked above it, thus enabling the extremely efficient storage and transportation of products distributed in its use; it can be changed from a collapsed position to an open position, or vice versa, by a simple direct lifting or lowering movement of part of the structure; and when collapsed it can be easily and efficiently piled or stacked and transported with many similar structures, so as to occupy extremely little storage space.

According to a typical construction, each of the new carriers is made as a freely collapsing box-shaped framework having parallel rigid top and bottom panel members, an interconnecting rigid back panel member hinged to their respective back ends, and interconnecting lateral link members hinged to them in parallel relation to the back member and so as to leave the front end of each carrier open for receiving a stack of the receptacles or other elongated articles slidably projected into the carrier. The inside height of each carrier adapted for transporting tubular bakery product receptacles or the like is fixed by the length of the interconnecting back and lateral members at slightly more than a multiple of the outside height of each receptacle, and the inside breadth of each carrier slightly exceeds the outside breadth of the receptacles; while the length of each carrier is less than the length of the receptacles so that end portions of the receptacles project horizontally outwardly from the open front of the carrier to give a desired distribution of its weight when loaded and to permit easy sliding movements of receptacles into and from the carrier and of bakery products or other fragile products into and from the receptacles. The weight distribution thus obtained is utilized to suspend the loaded carrier in a tilted position, such that the receptacles project from it at a slightly upward inclination when the carrier is lifted and carried by hand. For so lifting and carrying it each carrier has a handle fixed to its top member near its open front end.

By providing parallel hinge connections between the top and bottom members, respectively, of each carrier and the interconnecting back and lateral members, the carriers are made easily collapsible to a flattened condition for efficient stacking in piles; yet the hinged rigid interconnecting members give each carrier, when it is open and stacked with other similar carriers, a vertical rigidity more than sufficient to sustain the weight of several loaded assemblies of carriers and stacks of receptacles. Moreover, a stack of the tubular receptacles fitting into such a carrier holds its hinged members in open position and thus gives each assembly enough rigidity that it can be easily lifted and carried by hand as above mentioned without objectionably changing in shape or crushing any of the receptacles or spilling any of their contents.

Further, the bottom and top panel members of each carrier may be provided with rigid complementary structures transverse to these members, so that the transverse structure of the bottom member of one carrier nests with the transverse structure of the top member of another similar carrier to assist in holding a plurality of the loaded carriers together in a safely transportable vertical stack.

According to preferred embodiments of the invention, the carriers are made as largely open frameworks of hinged panel and link members formed of suitably rigid metal wire or bar stock; or they may be made as substantially open frameworks of hinged top, bottom and end members formed by centrally open rectangular pieces of pressed fiberboard or other suitably strong sheet material and interconnected by suitable link members at the lateral sides.

The collapsing carriers loaded with product receptacles may be conveyed from loading stations to delivery trucks, or to other means of distributing them to desired destinations, either by hand or by any desired type of conveyor. When conveyors are used they may support the carriers either in suspension or in an upright seated position. As here illustrated and as described more particularly hereinafter, special pushable baskets or cradles suspended from overhead rails or trackways may be used to hold and convey stacks of the loaded carriers.

Further objects, features and advantages of this invention will be apparent from the following detailed description of preferred embodiments and from the accompanying illustrative drawings in which:

Fig. 1 is a side elevation of one of the collapsing carriers assembled with a stack of tubular bread loaf receptacles;

Fig. 2 is a perspective view of the carrier of Fig. 1 as it appears in fully open position with the receptacles removed;

Fig. 3 is a side view of the same carrier in a partially collapsed condition;

Fig. 4 is a perspective view of one of the tubular receptacles in fully open condition;

Fig. 5 is a perspective view of the same receptacle in a partially collapsed or flattened condition;

Fig. 6 is a side elevation of one of the carrier baskets filled with loaded carriers;

Fig. 7 is a perspective view of another form of carrier;

Fig. 8 is a side view of the carrier of Fig. 7 in a partially collapsed or flattened condition;

Fig. 9 is a diagrammatic view of a manner of loading the apparatus with loaves of bread passing from the discharge conveyor of a bread wrapping machine; and Fig. 10 is a diagrammatic rear end view of part of a bakery delivery truck stowed with stacks of the loaded carriers for distribution to customers.

According to the embodiments illustrated in the drawings, the handling and distribution of bread loaves in the manner above indicated is carried out by means of a collection of collapsing carriers A or A1 of the form shown in Fig. 2 or Fig. 7, each adapted to hold and position a stack of fitting elongated tubular bread loaf receptacles B projected through the open end of the carrier; and by means of a collection of special movable open baskets of the type shown at C, each of which holds and transports a stack of the loaded carriers in transit or storage between a bread wrapping machine and the truck loading platform of a bakery plant. As many receptacles B are accommodated by each carrier A as may be conveniently lifted and carried by one hand, this number generally being four in the case of apparatus adapted for the handling of the more common sizes of bread loaves. The number of loaves L to be accommodated by each receptacle depends upon similar considerations and generally is four or five, in the case mentioned. The number of carriers accommodated by each movable basket is generally three, being dependent upon the carrier height and the reach of workmen who lift loaded carriers by hand to stack them in or remove them from the carrier-conveying baskets.

A suitable form of the tubular receptacles used for bread loaves appears in Fig. 4 and Fig. 5. Each receptacle is an elongated quadrilateral tube open at both ends and composed of parallel top and bottom walls 1 and 2 and parallel side walls 3 and 4. These walls are interconnected at flexible or hinged corners 5 so that each tube normally has the open rectangular form of Fig. 4 but can be collapsed to a flat condition for efficient storage or conveyance by lateral movement of the side walls relative to the top or bottom wall. A partially collapsed or flattened condition is indicated in Fig. 5. The tube walls may be made of paper, boxboard or other suitable sheet material. If desired, they may be transparent or may be formed with openings to expose the loaves.

When any of the tubular receptacles is held open it possesses enough vertical rigidity to sustain the weight of a considerable number of similar tubes stacked over it. Four of the receptacles in a vertical stack are seen in Fig. 1 as they are held and carried by one of the carriers A.

The construction and functioning of the carriers A are illustrated in Figs. 1 to 3, 6, 9, and 10. Each carrier has the form of a parallelepipedon defined by a box-shaped framework open at the front side and composed of parallel rigid top and bottom panel members 10 and 11, respectively, a rigid back panel member 12 interconnecting backward ends of the top and bottom members, and rigid lateral link members 14a, 15a and 14b, 15b interconnecting the top and bottom members at opposite lateral sides of the framework. This structure is completely open at its forward end so as to receive therethrough a stack of four of the receptacles B which extend slidably into the carrier and are held by it as seen in Figs. 6, 9 and 10.

The lateral members 14a and 14b in this construction are the longer sides of a closed rectangular loop of stiff wire or bar stock which borders the open front of the carrier and of which the shorter sides 14c and 14d form supports or axles hinging these members to the top and bottom members 10 and 11. The lateral members 15a and 15b similarly are the longer sides of a closed rectangular loop of stiff wire or bar stock, of which the upper and lower shorter sides 15c and 15b form hinge supports or axles for backward portions of the rigid top and bottom members.

The top member 10 is formed of a plurality of spaced longitudinal wire or bar elements and a plurality of crossing wire or bar elements joined firmly thereto. The longitudinal elements are arranged in pairs to include outermost bars 16, intermediate bars 17 and inner bars 18, all of which are welded to a plurality of spaced transverse bars 19. The rigid bottom member 11 has a similar construction and therefore need not be described in detail.

The rigid back member 12 is formed of a plurality of spaced parallel bar or wire elements 20 which extend vertically in the fully open condition of the carrier and are rigidly interconnected at their upper and lower ends by transverse bar or wire elements 21 and 22 welded to the upright bars 20. Crossing diagonal stiff wires or bars 23 also may be welded to the upright bars 20 in order to strengthen the back member.

The transverse elements 21 and 22 of back member 12 form parallel hinges connecting this member with the top and bottom members 10 and 11, by engagement with end portions 24 of the respective longitudinal bars 17 and 18. These end portions are bent around and rotatable on elements 21 and 22. The top and bottom members also have parallel hinge connections with the upper parts 14c, 15c and the lower parts 14d, 15d of the two rectangular loops, these connections being obtained by bending the forward and backward ends 25 and 26, respectively, of the respective longitudinal bars 16 about parts 14c, 15c, as to the top member, and about parts 14d and 15d, as to the bottom member. The forward ends of the respective intermediate bars 17 of members 10 and 11 also may be bent around the parts 14c and 14d as indicated at 27.

In this way, each carrier can be made as a strong, predominantly open framework which is light in weight and easy to carry, but which has no apparent usefulness as a box or receptacle except for purposes of this invention. When the carrier is open as seen in Fig. 2, it is rigid vertically and laterally so that it can sustain heavy loads applied to it in vertical direction and will hold receptacles B stacked within it in their open condition. The assembly of a carrier and a stack of the receptacles can be lifted and carried with one hand by use of a handle 30 pivotally connected to loop element 14c for suspending the carrier from the front and center of its top structure. This handle preferably is a U-shaped piece of stiff wire or bar stock having its ends 31 bent around part 14c. In this way the handle 20 is able to swing from an upright carrying position, as shown in Fig. 1, to an unobtrusive position along the top wall of the uppermost receptacle held in the carrier, as seen in Figs. 9 and 10.

When a carrier A is loaded with filled receptacles B and suspended from the handle 30, more of the weight of the assembly lies behind than in front of the axis of the handle so that the assembly assumes a tilted position, indicated in Fig. 1, in which the receptacles project forward from the carrier at an upward inclination. This prevents articles held in the receptacles from sliding out of their open forward ends as a loaded assembly is carried by hand or by an overhead conveyor from one place to another. It also facilitates the loading of each carrier with receptacles and/or the loading of products into receptacles held in the carrier.

The hinge connections between the frame-forming members of the carrier allow the carrier thus carried to assume an oblique form, but the vertical rigidity of the stack of receptacles limits the extent of this change of form. On the other hand, when the receptacles are removed from a carrier, the entire carrier framework can be collapsed quickly to a flat condition; so a large number of the carriers can be piled together with very little utilization of storage space. Fig. 3 shows one of the carriers in a partially collapsed position, such as it would assume before complete convergence of the top, bottom, back and lateral members.

From Figs. 1 to 3 it will be evident that the respective transverse elements 19 of the top and bottom members 10 and 11 are disposed at the outer sides of the longitudinal elements 16, 17 and 18, as also are the upper loop elements 14c, 15c and lower loop elements 14d, 15d. Accordingly, these elements project transversely from the planes of the top and bottom members; and they are so disposed that when one carrier is stacked upon another, these elements of the bottom member of the one carrier nest or interengage with the similar elements of the top member of the other carrier so as to hold the carriers in a stable vertical stack, as seen, for example, in Fig. 10.

An alternative form of construction of the portable carriers is illustrated in Figs. 7 and 8. As there shown, each carrier A1 has rigid top, bottom and back panel members 40, 42 and 44, respectively, which are formed as centrally open rectangular pieces of pressed fibreboard or other suitable strong sheet material. The upper end of back member 44 is connected through a hinge 45 with the backward end of top member 40, while the lower back of end member 44 is connected by hinge 46 with the backward end of bottom member 42.

The top and bottom members 40 and 42 are also interconnected by means of rectangular loops of the type described in connection with Figs. 1 to 3. The upper or shorter parts 47c and 48c of these loops are hinged in parallel relation to forward and backward portions of top member 40 as indicated at 49 and 50, respectively. The lower parts 47d and 48d are similarly hinged at 51 and 52 to forward and backward parts of the bottom member 42. Again, the upright legs 47a, 47b and 48a and 48b of the rectangular loops constitute rigid lateral link members of the carrier framework. At the top of the open front of the framework a handle 54 similar to handle 30 is connected with the upper part 47c of the forward rectangular loop.

The functions and manner of use of the fibreboard carriers A1 are substantially the same as those of the wirework carriers A. A partially collapsed or flattened condition of a fibreboard carrier is seen in Fig. 8.

A manner of filling loaded carriers with fresh bakery products and a manner of transporting a filled carrier-receptacle assembly between a wrapping machine and a truck loading platform of a bakery are illustrated schematically in Fig. 9 of the drawings. A carrier A holding a stack of four receptacles B is placed on a sloped support S at the discharge end of the roller conveyer M of a bread wrapping machine. The sloped support S forms part of a lift 60 which is suspended by a cable or cables 61 and bracket 62 in vertical sliding relation to a standard 63. The standard has displaceable stop pins 64 arranged at different levels to engage bracket 62 and determine the height of the lift. The cable 61 extends over pulley 65 to a counterweight 66 which urges the lift upwardly to rest positions determined by the pins 64.

In a low position of the lift 60 the uppermost receptacle B in an open carrier resting on the lift may be so aligned with the end of the conveyor M that a layer of wrapped bread loaves passing from the wrapping machine can be slid directly into the uppermost receptacle. When this receptacle is filled, the lowest stop pin 64 is displaced, causing the counterweight to lift the assembly by one step and dispose the second receptacle in a convenient loading position. When this receptacle is filled the third, and then the lowermost, receptacle will likewise be filled, each with a layer of four or five bread loaves. Then the filled assembly is lifted manually by its handle 30 and placed in a stack of carriers in one of the movable baskets C for movement to a truck loading station, or for temporary storage in the basket before being loaded into a delivery truck. If desired, the filled carriers may be carried individually to a truck loading station, either by hand or by any desired type of conveyor.

The basket C is one of many similar baskets which normally are suspended from hangers 70 carried rollably on an overhead trackway 72. The trackway 72 describes a circuit extending from loading stations at wrapping machines in the bakery to the truck loading platform or platforms of the bakery, and this circuit may also include branches or side tracks on which groups of loaded baskets may be held to await the arrival of delivery trucks which receive and distribute the contents of the baskets. The hangers 70 may be of any suitable construction. As shown, they have spaced rollers 71 which ride on opposite horizontal flanges 73 of an I-beam trackway, and a hook 74 depends from each hanger to engage an eye or hook 75 on the top of a basket C and thus support the basket movably in suspension from the trackway. Thus each basket can be moved easily along the trackway, in either direction, by a light pressure or push on the basket C.

The basket itself is constructed as a simple vertically elongated box-shaped structure of interconnected rigid top, bottom, end and side members, this structure being completely open at one end and dimensioned to receive horizontally through its open end a stack of three of the carriers A or A1 loaded with receptacles B. In the form shown, the basket is a predominantly open framework composed of four rigidly interconnected pieces of stiff wire or bar stock. Two long rectangular loops of this material, as seen at 80 and 82, are disposed in spaced parallel relation with loop 80 bordering the open front of the structure. The spaced long sides 80a, 82a and 80b, 82b of these loops constitute the opposite side members of the basket, and the spaced top and bottom parts of the loops, indicated at 80c, 82c and 80d, 82d, respectively, constitute parts of the top and bottom members of the basket. The two closed loops are assembled and joined with two U-shaped pieces of stiff wire or the like, which are disposed vertically in spaced parallel relation with their upper legs 84a and 85a extending transverse and welded to the upper loop parts 80c, 82c. Their lower legs 84b and 86b are similarly joined in transverse relation to the lower parts 80d, 82d of the rectangular loops. The long base elements 84 and 85 of the U-shaped members extend vertically and constitute the rigid back member of the basket.

As seen in Fig. 6, each basket C is sloped at the bottom so that the carriers held in the basket will have an oblique or tilted position and will hold the receptacles B at an upward inclination so as to keep articles from falling out of the receptacles. The top member of each basket has a support or plate 86 secured to it in bridging relation to parts 80c and 82c, and the eye or hook 75 which engages a hanger hook 74 may be pivotally connected to this support.

It will now be evident that each carrier A or A1, when loaded with receptacles and filled at a bread wrapping machine as illustrated in Fig. 9, may be lifted by hand from the lift support S and then conveyed in a stack with other carriers in one of the baskets C, or in any other desired manner, to any desired location at the bakery without imposing any objectionable burden on workmen. The loading and transportation of the bakery products involves no individual handling of the products and no hazard of damage to them. When filled carriers reach the truck loading platform of the bakery, the carriers can be easily lifted by hand from the basket or other means of conveyance and re-stacked within a delivery truck in the manner shown in Fig. 10.

The truck in turn transports the filled carriers to food markets or other points of distribution, at each of which a deliveryman simply lifts one or more of the filled carriers from a stack in the truck and carries them by hand to the final destination. At that point the filled receptacles may be easily slid out of a carrier and emptied by sliding the bread loaves from the open ends of the receptacles; or any filled receptacle may be removed and replaced in its carrier by an empty receptacle; or a filled carrier-receptacle assembly may be left at the delivery point and utilized there for displaying and dispensing the products held in the receptacles.

It will also be evident that any emptied receptacle and any emptied carrier can be easily collapsed to a flat condition for the efficient storage or transportation of piles of these units.

For the display and identification of trade marks, brand names or grades of product, or for identifying the ownership of each carrier, a display plate 90 may be fixed to the top member 10 of the carrier framework, as seen in Fig. 2.

It will be understood that the new features described hereinabove and illustrated in the drawings may be embodied in various forms of apparatus, without restriction to details of the illustrated embodiments except as required by a fair construction of the claims.

I claim:

1. A carrier for transporting stacked articles, for example, tubular receptacles for fragile products such as bakery products, comprising a collapsible structure in the form of a vertically elongated upright hollow parallelepipedon open at its front to receive such articles therethrough and having a back defined by an upright rigid panel, two opposite sides defined by rigid panels hinged to opposite ends of said back panel, and two other opposite sides defined by rigid link members hinged to said side panels in spaced relation to said back panel, the hinges connecting each of said side panels with said back panel and with said link members lying in a common plane and the respective hinge planes of the two side panels being parallel, the height of said structure being its longest dimension, its inside breadth slightly exceeding the breadth of one of said articles, and its inside horizontal depth being less than the length of said articles, so that said structure in an open upright position will receive and confine single ones of said articles in one vertical stack, with the articles protruding forwardly through said open front and tending themselves to hold said structure open, said structure when emptied being collapsible to a flattened condition by swinging its parts on said hinges to a position in which one side panel and said link members are folded back upon said back panel in nearly parallel relation to the back panel and the other side panel.

2. A carrier for transporting stacked articles, for example, tubular receptacles for fragile products such as bakery products, comprising a collapsible structure in the form of a vertically elongated upright hollow parallelepipedon open at its front and having a back defined by an upright rigid panel, two opposite sides defined by rigid panels hinged to opposite ends of said back panel, and two other opposite sides defined by rigid link members hinged to said side panels in spaced relation to said back panel, the hinges connecting each of said side panels with said back panel and with said link members lying in a common plane and the respective hinge planes of the two side panels being parallel, the height of said structure being its longest dimension, its inside breadth slightly exceeding the breadth of one of said articles, and its inside horizontal depth being less than the length of said articles, so that said structure in an open upright position will receive and confine single ones of said articles in one vertical stack, with the articles protruding forwardly through said open front and tending themselves to hold said structure open, said structure when emptied being collapsible to a flattened condition by swinging its parts on said hinges to a position in which one side panel and said link members are substantially superimposed upon the back panel in nearly parallel relation to the back panel and the other side panel, two of said opposite sides comprising rigid elements which extend vertically from the bottom to the top of said structure when the latter is in its open upright position to render said structure vertically rigid, and one of the other two of said opposite sides then forming a rigid top of said structure capable of supporting another similar carrier stacked thereupon.

3. A carrier as described in claim 1, the bottom and top sides of said carrier respectively having complementary rigid structures transverse thereto whereby the top of one such carrier in open position mates with the bottom of a similar carrier stacked thereupon to form a stable stack of carriers.

4. A carrier as described in claim 1, said structure having a handle on the top one of its sides whereby the loaded carrier is portable by lifting it and carrying it in suspension with one hand, said handle being located horizontally forward of the center of gravity of the loaded carrier so that the carrier and articles therein tilt downwardly toward said back from said open front when suspended by said handle.

5. A portable carrier for transporting stacked articles, for example, tubular receptacles for bakery products, comprising a vertically elongated upright hollow box-like structure open at its front side to receive such articles therethrough, said structure having an upright rigid back closure and spaced parallel rigid closures forming two of its other sides, said parallel closures being hinged at their respective backward ends to opposite ends of said back closure, and two upright rigid rectangular loops in spaced and substantially parallel relation to each other and to said back closure, each of said loops having opposite legs hinged respectively to said parallel closures, the hinges connecting each of said parallel closures with said back closure and with said loops lying in a common plane and the respective hinge planes of the two parallel closures being substantially parallel, the other opposite legs of said loops forming swingable rigid article confining links across the remaining sides of said structure, the height of said structure being its longest dimension, its inside breadth slightly exceeding the breadth of one of said articles, and its inside horizontal depth being less than the length of said articles, so that said structure in an open upright position will receive and confine single ones of said articles in one vertical stack, with the articles protruding forwardly through said open front and tending themselves to hold said structure open, said structure when emptied being collapsible to a flattened position by swinging one of said parallel closures and said loops relative to the other of said parallel closures and said back closure.

6. A portable carrier for transporting stacked articles, for example, tubular receptacles for bakery products, comprising a vertically elongated upright hollow box-like structure open at its front side to receive such articles therethrough, said structure having an upright rigid back closure and spaced parallel rigid closures forming two of its other sides, said parallel closures being hinged at their respective backward ends to opposite ends of said back closure, and two upright rigid rectangular loops in spaced and substantially parallel relation to each other and to said back closure, each of said loops having opposite legs hinged respectively to said parallel closures, the axes of all the hinge connections of said structure being substantially parallel, the other opposite legs of said loops forming swingable rigid article confining links across the remaining sides of said structure, the height of said structure being its longest dimension, its inside breadth slightly exceeding the breadth of one of said articles, and its inside horizontal depth being less than the length of said articles, so that said structure in an open upright position will receive and confine single ones of said articles in one vertical stack, with the articles protruding forwardly through said open front and tending themselves to hold said structure open, said structure when emptied being collapsible to a flattened position by swinging one of said parallel closures and said loops relative to the other of said parallel closures and said back closure, one of said loops being disposed at the forward ends of said parallel closures and defining the open front of the carrier.

7. A portable carrier for transporting a stack of articles such as tubular receptacles for bakery products, comprising a vertically elongated upright box-shaped structure open at its front side to receive such articles projecting horizontally therefrom, said structure having an upright substantially flat rigid back closure and spaced parallel substantially flat rigid closures forming two of its other sides, each of said closures being formed of a plurality of longitudinal metal wire elements and transverse wire elements rigidly interconnecting the longitudinal elements, said parallel closures having respective backward ends hinged to opposite ends of said back closure, at least two rigid rectangular wire loops respectively having opposite legs hinged to said parallel closures in parallel and spaced relation to each other and to the hinge connections of said back closure, the other opposite legs of said loops being substantially parallel to and of substantially the same length as the back closure and forming swingable article confining links across the remaining sides of the structure, one of said loops defining the open front of the structure and having a handle on its upper leg whereby the carrier suspended from said handle assumes a tilted position to retain articles securely therein, the height of said structure being its longest dimension, its inside breadth slightly exceeding the breadth of one of said articles, and its inside horizontal depth being less than the length of said articles, so that said structure in an open upright position will receive and confine single ones of said articles in one vertical stack, with the articles protruding forwardly through said open front and tending themselves to hold said structure open, said structure when emptied being collapsible to a flattened position by swinging one of said parallel closures and said loops relative to the other closures.

8. A portable carrier as described in claim 7, the hinge connections of said parallel closures with said legs being formed by ends of said longitudinal wire elements looped about said legs.

9. A portable carrier for transporting a stack of articles such as tubular receptacles for bakery products, comprising a vertically elongated upright box-shaped structure open at its front side to receive such articles projecting horizontally therefrom, said structure having an upright substantially flat rigid back closure and spaced parallel substantially flat rigid closures forming two of its other sides, each of said closures being formed of substantially rectangular pieces of rigid sheet material, said parallel closures having respective backward ends hinged to opposite ends of said back closure, at least two rigid rectangular wire loops respectively having opposite legs hinged to said parallel closures in parallel and spaced relation to each other and to the hinge connections of said back closure, the other opposite legs of said loops being substantially parallel to and of substantially the same length as the back closure and forming swingable article confining links across the remaining sides of the structure, one of said loops defining the open front of the structure and having a handle on its upper leg whereby the carrier suspended from said handle assumes a tilted position to retain articles securely therein, the height of said structure being its longest dimension, its inside breadth slightly exceeding the breadth of one of said articles, and its inside horizontal depth being less than the length of said articles, so that said structure in an open upright position will receive and confine single ones of said articles in one vertical stack, with the articles protruding forwardly through said open front and tending themselves to hold said structure open, said structure when emptied being collapsible to a flattened position by swinging one of said parallel closures and said loops relative to the other closures.

10. A collapsible carrier comprising substantially rigid closed wire loops of substantially rectangular shape spaced apart in substantially parallel upright planes, the spaces within said loops being entirely open to receive articles in a stack extending therethrough, one of said loops defining an open front of the carrier, substantially rigid wire links extending transverse to and connecting respective opposite legs of each of said loops with corresponding opposite legs of another of said loops, the spaces between the other opposite legs of said loops being open, said links having ends looped about said interconnected legs to form hinges and the axes of all said hinges being substantially parallel, whereby the carrier may be collapsed by folding one of said loops and the links connected with one of its legs upon the links connected with its opposite leg and another of said loops.

11. A collapsible carrier comprising substantially rigid closed wire loops of substantially rectangular shape spaced apart in substantially parallel upright planes, the spaces within said loops being entirely open to receive articles in a stack extending therethrough, one of said loops defining an open front of the carrier, horizontally and backwardly extending links extending transverse to and connecting each of two opposite legs of one loop with a corresponding one of two opposite legs of another of said loops, the spaces between the other opposite legs of said loops being open, said links having hinge connections with said interconnected legs and the axes of all the hinge connections of the carrier being substantially parallel, whereby the carrier may be collapsed by folding one said loops and the links connected with one of its legs upon the links connected with its opposite leg and another of said loops.

12. A collapsible carrier comprising substantially rigid closed wire loops of substantially rectangular shape spaced apart in substantially parallel upright planes, the spaces within said loops being entirely open to receive articles in a stack extending therethrough, one of said loops defining an open front of the carrier, a plurality of substantially rigid links extending transverse to and connecting each of two opposite legs of each loop with a corresponding one of two opposite legs of another of said loops, the spaces between the other opposite legs of said loops being open, said links having hinge connections with said interconnected legs and the axes of all the hinge connections of the carrier being substantially parallel, whereby the carrier may be collapsed by folding said one loop and the links connected with one of its legs upon the links connected with its opposite leg and another of said loops, and means rigidly interconnecting the links of each plurality of links so that they form a rigid closure unit.

References Cited in the file of this patent

UNITED STATES PATENTS

| Number | Name | Date |
|---|---|---|
| 300,979 | Huff | June 24, 1884 |
| 415,115 | Medart | Nov. 12, 1889 |
| 449,007 | Spain | Mar. 24, 1891 |
| 482,644 | Marquis | Sept. 13, 1892 |
| 550,518 | Marquis | Nov. 26, 1895 |
| 1,976,811 | Stanyan | Oct. 16, 1934 |
| 2,166,429 | Faulkner | July 18, 1939 |
| 2,315,001 | Logan | Mar. 30, 1943 |
| 2,333,954 | Rocker et al. | Nov. 9, 1943 |
| 2,496,778 | Concklin | Feb. 7, 1950 |
| 2,529,267 | Sloane | Nov. 7, 1950 |

FOREIGN PATENTS

| Number | Country | Date |
|---|---|---|
| 831,886 | Germany | Feb. 18, 1952 |